United States Patent [19]

Bradley et al.

[11] Patent Number: 4,881,774
[45] Date of Patent: Nov. 21, 1989

[54] MEMORY SEAT TRACK ASSEMBLY FOR VEHICLE SEAT

[75] Inventors: David W. Bradley, St. Clair Shores; Angelo R. Melotti, Troy; Oliver Lecere, Farmington Hills; Gerald P. Bonnici, St. Clair Shores, all of Mich.

[73] Assignee: Bertrand Faure Automobile, Rocquencourt, France

[21] Appl. No.: 268,131

[22] Filed: Nov. 7, 1988

[51] Int. Cl.⁴ .................. A47C 1/02; F16M 13/00
[52] U.S. Cl. .................... 297/341; 248/430; 297/346
[58] Field of Search ............ 297/341, 346; 248/429, 248/430

[56] References Cited

U.S. PATENT DOCUMENTS

| | | | |
|---|---|---|---|
| 4,648,657 | 3/1987 | Cox et al. | 297/341 |
| 4,652,052 | 3/1987 | Hessler | 297/341 |
| 4,707,030 | 11/1987 | Harding | 248/430 |
| 4,742,983 | 5/1988 | Hihei | 297/341 |

Primary Examiner—James T. McCall
Attorney, Agent, or Firm—Dykema Gossett

[57] ABSTRACT

A vehicle seat track assembly for allowing a seat to be selectively moved rearwardly and forwardly. The seat track assembly allows the vehicle seat to be secured at a desired selected position. The seat track assembly further allows the seat to be moved forwardly to provide access to the area behind the seat. When the seat is moved forwardly, the seat track assembly has a memory that will remain in place and stop the seat upon its return to the selected position.

10 Claims, 4 Drawing Sheets

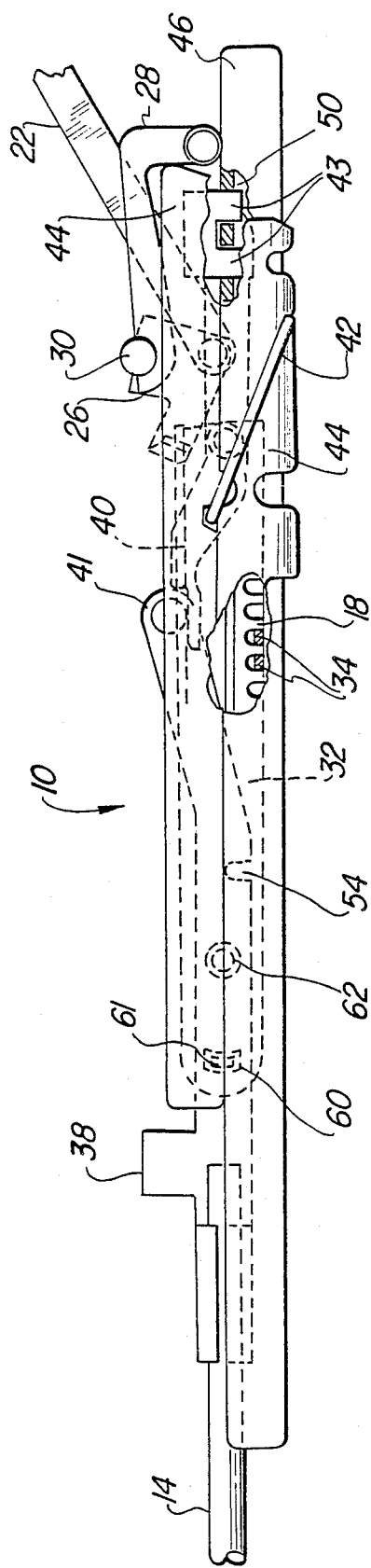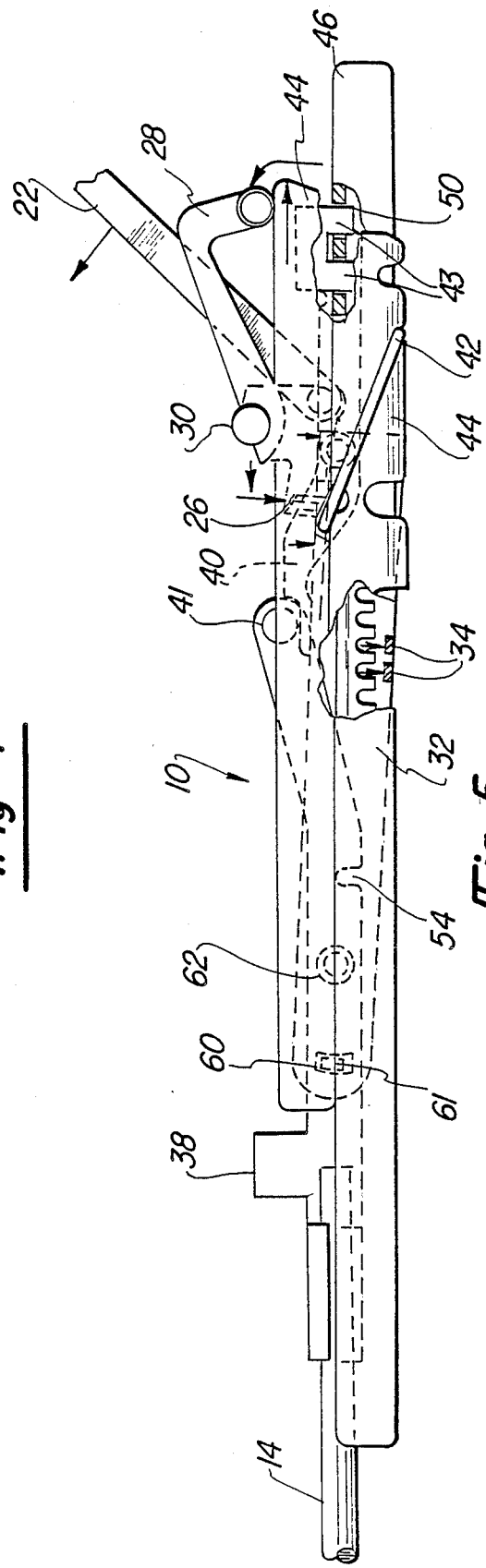

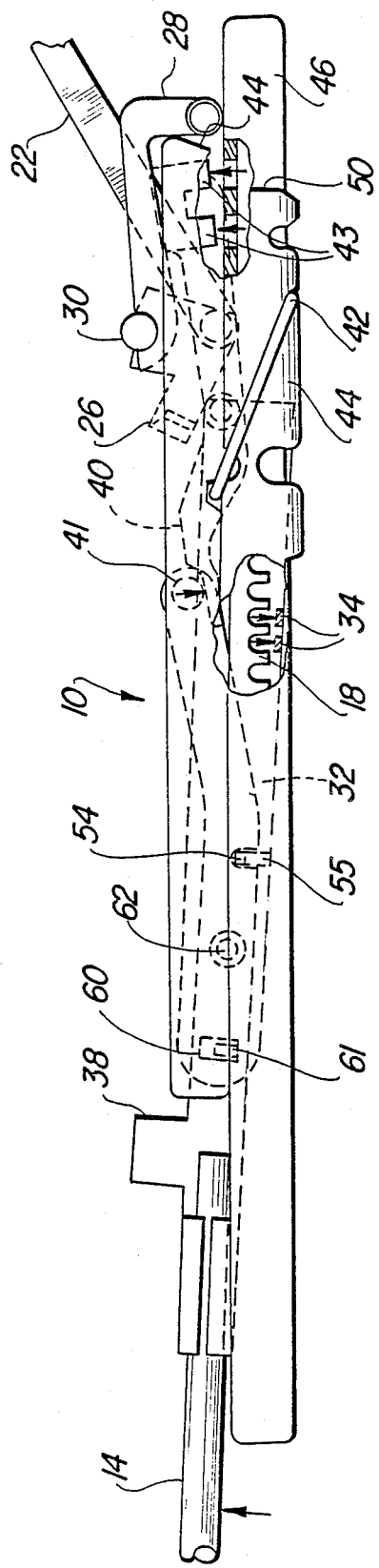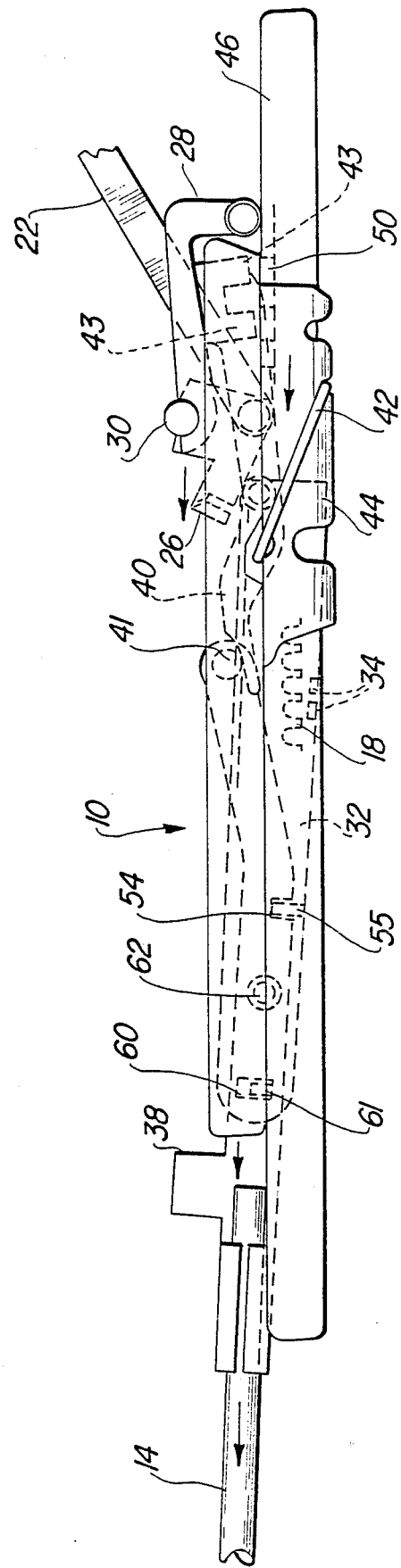

MEMORY SEAT TRACK ASSEMBLY FOR VEHICLE SEAT

BACKGROUND OF THE INVENTION

The present invention relates to a seat track assembly for automotive seats which permit the seat to be selectively positioned forwardly and rearwardly relative to the vehicle floor.

Automobiles and other vehicles are typically equipped with a seat whose position is adjustable for several reasons including driver and passenger comfort and to permit easier entry and exit from the vehicle. Modern automobiles are frequently equipped with seat positioners permitting adjustment in a number of directions. These devices include track assemblies that allow the seat to be moved forwardly and rearwardly. Such devices allow the seat to be positioned at any one of several positions to compensate for the driver or passenger's height, or to provide more room in the area behind the seats.

In modern two door automobiles the front seat must be moved in order to permit access to the rear seat area behind the front seat. Modern automobiles typically have seat positioners that can be released and moved forwardly to allow access to the rear seat area. This access facilitates the entry and exit of passengers and the storage and removal of goods in the rear seat area. The seat is returned rearwardly when access to the rear seat is no longer necessary.

Problems with seat positioners arise when the seat is returned rearwardly. The seat positioner will permit the return of the seat to its rearmost position. The driver or passenger must then reset the seat to the desired driving position. This is inconvenient and time consuming. In addition, if the seat is returned to its rearmost possible position, it can prove uncomfortable to passengers in the return seat or harmful to goods stored there.

It is, therefore, an object of the present invention to provide a seat position track assembly that allows the seat to be positioned at any one of several possible positions, and the assembly will have a mechanical memory of that position. It is further an object of the present invention to allow access to the rear seat area by sliding the seat forwardly, but to stop the seat on its return at the selected position by use of the mechanical memory. Moreover, it is an object of this invention to achieve these characteristics with a track assembly that is sturdy and requires relatively few moving parts.

These and other objects are addressed by the present invention.

SUMMARY OF THE INVENTION

In accordance with the present invention, a track assembly for automotive seats is disclosed which permits the seat to be moved forwardly and rearwardly to any one of several positions. The track assembly includes a fixed guide channel, a sliding channel, and a memory channel assembly. A first handle allows the seat position assembly to be released and selectively positioned. A second handle allows the seat to be moved forwardly to allow access to the area behind the seat. Upon return of the seat, the memory channel assembly returns the seat to the selected position.

The seat is generally held in the selected position by two sets of notch and teeth combinations. A track latch member is biased such that its notches engage first teeth members on the fixed guide channel to latch the seat. A memory lock member is biased such that its notches engage second teeth members on a memory rail to lock the seat. The memory lock member and memory rail are associated with the memory assembly.

The first handle actuates a main cam member which actuates the track latch member and memory lock member. The track latch member acts against the bias of a spring upon rotation of the first handle, thereby unlatching its notches from the first teeth members. The memory lock member acts against the bias of another spring when the first handle is rotated, thereby unlocking its notches from the second teeth members on the memory rail. The seat can then be slid to any desired position within its allowed extent. A follower roller is disposed behind the memory channel assembly for sliding the memory channel assembly forwardly on the memory rail when the seat is moved forwardly. Once the desired position is attained, the first handle is released and the first and second sets of teeth and notches re-engage to latch and lock the seat.

When it is desired to gain access to the area behind the seat, the second handle is actuated by movement of the seat back. Actuation of the second handle actuates an unlatching cam and moves the follower roller from behind the memory channel assembly. The unlatching cam acts against the track latch member for unlatching its notches from the first teeth members. The movement of the follower roller upwardly from behind the memory channel assembly permits the roller to move forwardly along the top of it. The seat can then be moved forwardly to permit access to the area behind the seat. The follower roller does not pull the memory channel assembly, and therefore, it remains in place and locked at the selected position.

When the seat is returned rearwardly, the follower roller rolls along the top of the memory channel assembly and is then snapped back into position behind the memory channel assembly. At the same time the unlatching cam is moved upwardly and no longer acts against the track latch member. Its notches are then re-latched with the first teeth members. Thus, the seat is returned to its selected position, and the driver or passenger need not reposition the seat.

Therefore, the present invention provides a seat track assembly that allows access to the rear seat but then returns the seat to its originally selected position. Further, the present invention provides an assembly that is sturdy and has relatively few moving parts.

Other advantages and features of the present invention will be more fully understood from the detailed description of the invention, the appended claims and the drawings, which are briefly described hereinbelow.

BRIEF DESCRIPTION OF THE DRAWINGS

FIG. 4 is a side view of the memory seat positioner assembly prior to actuation of the latch release handle.

FIG. 5 is a side view of the memory seat positioner assembly illustrating the movement of the various members upon actuation of the latch release handle.

FIG. 6 is a side view of the memory seat positioner assembly illustrating the movement of the various members upon actuation of the seat release handle.

FIG. 7 is a side view of the memory seat positioner assembly illustrating the movement of the various members as the seat is advanced forwardly after actuation of the seat release handle.

DETAILED DESCRIPTION OF THE INVENTION

Figure 1:
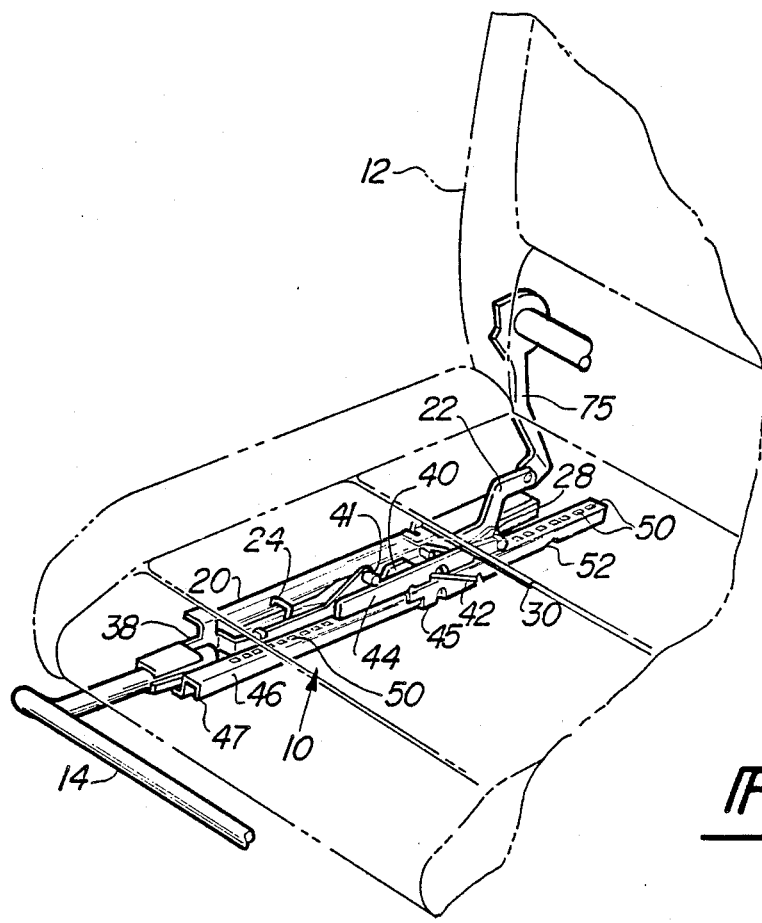
FIG. 1 is a perspective view of a memory seat positioner assembly operably disposed beneath an automobile seat.
Figure 2:
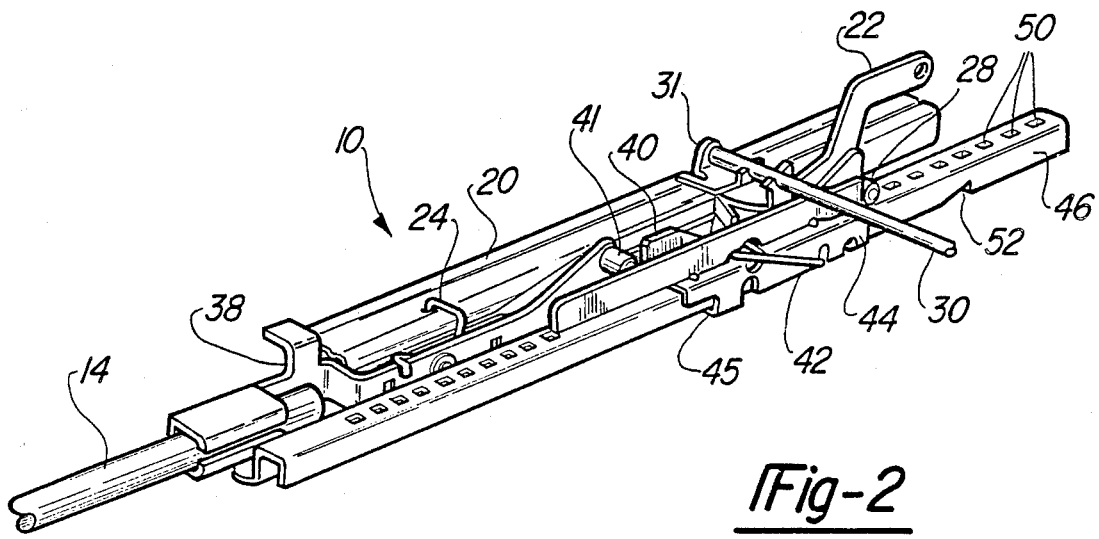
FIG. 2 is an enlarged perspective view of the memory seat positioner assembly.

The memory seat positioner assembly 10 of the present invention is illustrated in FIGS. 1-7. As shown in FIG. 1, the memory assembly is disposed beneath a conventional vehicle seat 12. The memory assembly allows the movement of the seat forwardly and rearwardly in the vehicle compartment.

The memory seat positioner assembly 10 comprises a lower channel member 16 that is fixed to the vehicle floor. An upper channel member 20 is secured to the bottom of the vehicle seat and slides on the lower channel member 16. Grooves 19 on the upper channel member slide on flanges 17 on the lower channel member. When upper channel member 20 is caused to slide on lower channel member 16 the seat 12 moves with it and can thus be adjusted to various positions within the vehicle compartment.

Seat release handle 14 extends forwardly from underneath the seat 12. The handle 12 can be used to position the seat at any one of several selected positions. when the seat is in a selected position it is secured by a track latch mechanism and a memory lock mechanism.

Figure 3:
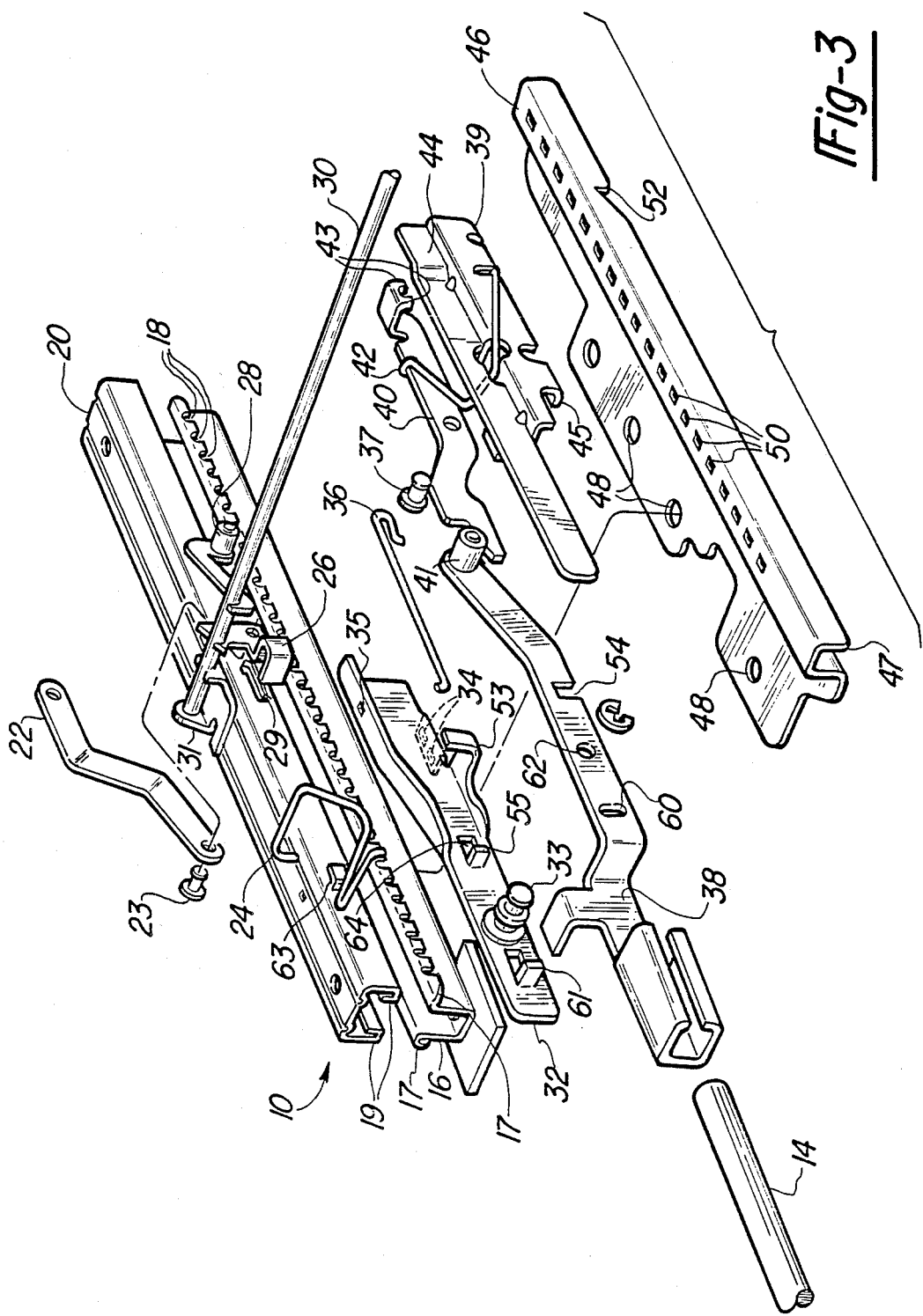
FIG. 3 is an exploded assembly view of the memory seat positioner assembly.

The track latch mechanism consists of teeth 18 formed along the flanges 17 of the lower channel 16 and notches 34 formed in a laterally extending flange on a track latch bar 32. When the seat is latched, the track latch bar 32 is biased upwardly by a connector spring 36 which is hooked in a connector aperture 35 at one end. The opposite end of the spring 36 is secured to the upper channel member 20. The flange on the latch bar 32 extends into an opening 29 in the side of upper channel member 20 (FIG. 3). Bar member 32 is normally biased upwardly such that the notches 34 latch and engage the teeth 18 formed in the flange 17 of the lower channel 16.

The memory locking mechanism consists of teeth 43 formed in a flange on memory lock cam 40 and notches 50 formed along a memory rail or channel 46. Memory channel 46 is attached to lower channel 16, and apertures 48 allow accurate positioning of the two channels. When the seat 12 is locked in a selected position, the lock cam 40 is biased downwardly such that the teeth 43 lock into the notches 50 formed in the memory channel 46. As shown in FIG. 4, a follower roller 28 abuts the rear of the slide member 44. When the memory locking mechanism is unlocked and the seat is moved forwardly, the follower roller 28 pulls the slide member 44 along with it. If the seat is moved rearwardly, a main cam member 38 pushes the memory lock cam 40 with it rearwardly.

The seat release and memory mechanism 10 will now be disclosed with particular reference to FIGS. 3, 6 and 7. The seat release handle 14 is secured to a main cam member 38. Track latch bar 32 includes a pin 33 which pivotally attaches the bar 32 to the main cam 38. At its rearward end, the main cam 38 includes a roller element 41. The roller element 41 rests freely on a portion of memory lock cam 40.

The lock cam 40 is pivotally and resiliently attached to a slide member 44 by a pin 37 and a spring 42. The combination of the lock cam 40 and the slide member 44 constitute a memory guide assembly 39 which may be selectively movable along memory rail 46. As slide member 44 moves along the memory rail 46, a lower lip 45 (FIG. 3) of the slide member 44 is engaged over flange 47 of memory rail 46. Thus, slide member 44 is constrained to move only forwardly and rearwardly. Further, spring 42 is secured to both slide member 44 and the lock cam 40 for biasing the lock cam member 40 rear portion downwardly which brings teeth 43 into locking engagement with the notches 50 in memory rail 46.

Referring to FIG. 3, spring 24 is attached to the top of the upper channel 20 for normally biasing main cam 38 downwardly. When the seat release handle 14 is pulled upwardly, main cam 38 pivots on pin 33 and roller 41 is forced downwardly. Roller 41 then engages the forward portion of the lock cam 40 and pushes it downwardly. Lock cam 40 then pivots on pin 37 and the rearward portion of lock cam 40 moves upwardly against the bias of the spring 42. Thus, the teeth 43 move upwardly and come out of engagement with the notches 50.

When the seat release handle 14 is pulled upwardly, it also unlatches the seat 12 for longitudinal movement. Referring to FIG. 3, pin 33 is mounted in an aperture 62 on the main cam 38. This pivotally attaches the main cam 38 and the track latch bar 32. Further, flanges 61 and 55 formed on the side of latch cam 32 ride in slots 60 and 54, respectively, formed in the main cam 38, thus limiting and guiding pivotal movement of the main cam 38 with respect to the latch cam 32. The main cam 38 may also come to rest on the top of a flange 53 which extends laterally from the side of latch bar 32. When the seat release handle 14 is moved upwardly, the main cam 38 will pivot about the latch cam 32, and its rear portion will move downwardly. This downward movement pushes the flange 53 downward and brings the entire latch bar 32 downward against the bias of the spring 36. Thus, notches 34 move downwardly and disengage from teeth 18.

After the seat release handle 14 is moved upwardly and the latch bar 32 and the memory lock 40 are disengaged, the seat can be moved forwardly or rearwardly. In this manner, the seat 12 can be positioned at any of several desired positions. Further, the memory guide assembly 39 will also move with the seat under these conditions since the follower roller 28 normally abuts it in the rear.

The operation of the seat positioner assembly 10 is further shown in FIG. 6. When the seat release handle 14 is moved upwardly, as indicated by the arrow, the main cam 38 pivots and its rear portion moves downwardly, as indicated by the arrow at roller 41. The roller 41 forces the front portion of the lock cam 40 downwardly and its rear portion pivots upwardly. As shown by the arrows, this brings the teeth 43 out of engagement with the notches 50. At the same time, the rear portion of the main cam 38 also pushes downwardly on the flange 53 of the track latch bar 32 (FIG. 3). This pushes the latch cam 32 and its associated flange and notches 34 downwardly, as illustrated by the arrow, and unlatches the notches 34 from the teeth 18.

FIG. 7 illustrates the forward positioning of the seat 12 after the seat release handle 14 has been actuated and the latch and lock mechanisms have been released, as set forth above. As shown in FIG. 7, the notches 34 are unlatched from teeth 18, and the teeth 43 are unlocked from the notches 50. As indicated by the arrow, the handle 14 and seat are moved forwardly. This will pull the main cam 38 forward as indicated by the arrow and also bring with it latch cam 32. As shown in FIG. 3, upper channel 20 includes a flange 63 on its side which engages a notch 64 in the latch cam 32 for supporting latch cam 32. Further, the laterally extending flange 34 operates in the enlarged slot 29 on the upper channel member 20. Also, spring 24 is attached to the upper channel member 20 and the main cam 38. These connections, when combined with the driver or passenger urging the seat itself forward, move the upper channel 20 and the seat 12 forward with the handle 14. When the seat 12 is moved forwardly, the release mechanism 22, 30, 26, and 28, as indicated by the arrow, will also move forwardly, and the follower roller 28 will pull the slide member 44, as indicated by the arrow, and the associated memory guide assembly 39 forwardly with the seat.

After the desired position is reached, the seat release handle 14 is released, and spring 24 biases the front of the main cam 38 downwardly. The pin 41 moves upwardly and releases the lock cam 40, and thereafter, teeth 43 are biased downwardly into the notches 50. Further, the rotation of main cam 38 releases the flange 53 and the notches 34 are biased back into engagement with the teeth 18.

The memory rail 46 also includes an end of travel notch 52 that limits the rearward movement of the seat 12. if the operator adjusts the seat rearwardly to this point, the spring 42 is biased upwardly along the bottom of the rail 46, thus engaging the end of travel notch 52. This stops any further rearward movement of the seat 12.

The operation of the seat positioner assembly 10 will now be disclosed with particular reference to FIGS. 3-5. A lever 22 is attached by pin 23 to a track release actuator 26. The release actuator 26 rests on top of the track latch bar 32. The release actuator 26 is secured to the rod 30. Rod 30 also has follower roller 28 attached to it. Further, the rod 30 is rotatably mounted on the upper channel 20 at a bracket mount 31. Rod 30 may be moved both longitudinally with the upper channel and rotate relative to the channel.

When it is desired to gain access to the area behind the seat 12, the release lever 22 is actuated by manually moving a handle (not shown) which is connected to link 75 (FIG. 1). When the lever 22 moves upwardly as shown in FIG. 5, the release actuator 26 will be pushed downwardly. Downward movement of the actuator 26 forces the latch bar 32 downwardly thereby unlatching notches 34 from the teeth 18.

The movement of the actuator 26 also applies a torque to the rod 30. This torque is counterclockwise as viewed in FIGS. 3 and 4-5. The torque on the rod 30 will rotate follower roller 28 upwardly. As seen best in FIG. 5, the movement of the follower roller 28 brings it upwardly out of engagement with the slide member 44.

The position of the members prior to actuation of the lever 22 is illustrated in FIG. 4. Notches 34 are shown as being latched on teeth 18, and teeth 43 are locked in the notches 50. The actuator 26 is biased upwardly, and the follower roller 28 is disposed behind the slide member 44 so as to be able to move it forwardly.

Actuation of the lever 22 is illustrated in FIG. 5, which indicates by arrows the lever 22 being moved upwardly. As shown by the arrow, this rotates the actuator 26 downwardly and pushes the track latch cam 32 and its associated notches 34 downwardly away from the teeth 18. This downward movement of the actuator 26 will apply a counterclockwise torque (as seen in FIG. 5) to the rod 30 and through the bar to the follower roller 28. As shown in FIG. 5, this torque rotates the follower roller 28 upwardly from behind the rear of the slide member 44 and allows it to roll along the top of the slide member 44, thereby leaving the memory in place.

After the follower roller 28 is unlocked from member 44 as shown in FIG. 5, the seat 12 can freely move forwardly. The memory guide assembly 39 stays stationary during this movement since it will not be pulled by the follower roller 28. The follower roller 28 rolls along the top of slide member 44 as the seat moves.

When there is no longer a need to gain access to the rear of seat 12, the seat is returned by moving it rearwardly. Lever 22 is released at this time, and spring 36 biases the latch bar 32 upwardly. This biases actuator 26 upwardly, and a clockwise torque is applied to the rod 30. However, the follower roller 28 is still on top of the slide member 44, and therefore, the follower roller 28 cannot move downwardly.

The seat 12 continues to move rearwardly until it reaches the previously selected position. When the selected position is reached, the follower roller 28 will be at the end of the slide member 44. The clockwise torque is still being applied to the rod 30 by the actuator 26. This torque will now rotate the rod clockwise and move the follower roller 28 back into a locked position against the rear end of slide member 44. At the same time, the actuator 26 will rotate upwardly and off the latch bar 32. The spring 36 will then bias the notches 34 back into engagement with teeth 18. Thus, the seat 12 is thus relatched and locked, and the passenger or driver need not reset the position of the seat since it has been returned to the preselected position.

It will be obvious to those skilled in the art, that various modifications can be made to the memory seat positioner assembly 10 and components used therein without departing from the spirit and scope of the present invention, which is defined by the appended claims.

We claim:

1. A vehicle seat positioning assembly that comprises:
   a seat;
   a first channel fixed to the vehicle;
   a second channel being slidably mounted on said first channel;
   a latch means that secures the second channel to the first channel at a selected position;
   a memory means that engages a third channel at the selected position;
   a first release that unlatches the latch means and unlocks the memory means and allows said seat and said memory means to be moved to another position;
   a second release that unlatches the latch means and allows said seat to be moved forwardly while leaving the memory means at the selected position; and
   upon actuation of the second release, the assembly allowing the seat to be moved forwardly and, upon returning rearwardly, stopping the seat at the selected position;

2. A vehicle seat positioning assembly as recited in claim 1, in which a follower member is attached to the seat and is normally disposed so as to move the memory means forwardly when the seat moves forwardly;

said follower member being operably connected to said second release;

said follower member being actuated by said second release so as to not move the memory means forwardly when the seat moves forwardly.

3. A vehicle seat positioning assembly as recited in claim 2, in which said follower member, after having been actuated by said second release, is biased to return to its normal position when the seat is returned rearwardly to its selected position.

4. A seat positioning assembly as recited in claim 1, in which said latch means includes a latch bar that is biased so as to engage the first channel;

and wherein said first handle, when actuated, actuates a main cam against which is attached to the latch bar for disengaging said latch bar from said first channel; and further wherein said second release, when actuated, actuates a cam which operates against the bias on the latch bar to unlatch it from the first channel.

5. A seat positioning assembly as recited in claim 4, in which said memory means includes a lock cam which is biased to engage said third channel; and said first handle, when actuated, also actuates said main cam against the bias on said lock cam to unlock it from said third channel.

6. A vehicle seat positioning assembly comprising:
a seat;
a first channel fixed to the vehicle;
a second channel fixed to the seat, said second channel sliding on said first channel, a latching means to latch said second channel to said first channel, said latching means being biased into a latched position and movable into an unlatched position, said latching means being normally biased into a latched position;
a memory means comprising a third channel fixed to the vehicle and a fourth channel slidably disposed on said third channel, a locking means to lock said fourth channel to said third channel, said locking means being biased into a locked position and movable into an unlocked position, said locking means being normally biased into said locked position;
a first release that allows positioning of the seat in a selected position, said first release being biased towards a non-actuating position, said first release, when moved against the bias to its actuated position, actuating a main cam member, said main cam member abutting both the latching means and the locking means;
and wherein actuation of the main cam by the first release acts against the bias on both the latching means and the locking means, forcing them to their unlatched and unlocked positions, respectively;
the actuation of said first release thus allowing movement of the seat to any of several selected positions and said memory means being moved with the seat to the selected position;
release movement of the first release at the selected position biasing the first release back to a non-actuating position, allowing the bias on the latching means to relatch the second channel and allowing the bias on the lock means to relock the fourth channel;
a second release that allows release of the seat for movement forwardly, said second release being biased towards a non-actuating position, said second release, when moved against the bias to its actuated position, actuating a unlatching cam, said unlatching cam abutting said latching means, actuation of said second release also actuating a follower member, said follower member abutting the memory means, said follower member normally forcing the memory means forwardly with the seat when the first handle is actuated;
and wherein actuation of the unlatching cam by the second release acts against the bias on the latching means to force it to its unlatched position and causes actuation of said follower member for moving the follower member into a position where it will not force the memory means forwardly with the seat, and actuation of said second release thus allowing the movement of said seat forwardly while retaining the memory means locked at the selected position;
and wherein, upon the release movement of the second release and return of the seat, the seat return being halted by the memory means at the selected position, the bias on the latching means returning the latching means to its latched position and said follower member being biased back into its normal position.

7. A vehicle seat positioning assembly as recited in claim 6, wherein said second release actuates said unlatching cam and said follower member.

8. A vehicle seat positioning assembly that comprises:
a seat;
an elongated lower channel stationary with the vehicle frame;
an elongated upper channel fixed to the seat and slidable on the lower channel to move the seat axially along the lower channel;
a first mechanism that allows the seat to be moved to any one of several selected positions along the lower channel and secured there;
a second mechanism that moves the seat forwardly;
a memory device that stops and locks the seat at the selected position when it is returned rearwardly after having been moved by the second mechanism; and
said memory device includes a memory channel that is stationary with the vehicle frame and a lock channel that is slidable on the memory channel.

9. A vehicle seat positioning assembly as recited in claim 8 in which:
said first mechanism can actuate and move both said upper channel and said lock channel and allows both channels to be secured at said selected position and said second mechanism will actuate and move said upper channel but not said lock channel.

10. A vehicle seat positioning assembly as recited in claim 9 in which:
a follower member is attached to said seat and disposed rearwardly of said lock channel and in which said follower member can move said lock channel forwardly when said first mechanism is actuated, and said second mechanism also actuates said follower member, forcing said follower member to move relative to said lock channel and allowing the follower member to be moved forwardly with the seat, leaving the lock channel at the selected position, said follower member, upon being moved rearwardly with the seat, returning to its position behind the lock channel when the seat returns to the selected position.

* * * * *